(12) United States Patent
Kolavennu et al.

(10) Patent No.: US 10,510,343 B2
(45) Date of Patent: Dec. 17, 2019

(54) SPEECH RECOGNITION METHODS, DEVICES, AND SYSTEMS

(71) Applicant: Ademco Inc., Golden Valley, MN (US)

(72) Inventors: Soumitri N. Kolavennu, Blaine, MN (US); SrinivasaRao Katuri, Bangalore (IN); Amit Kulkarni, Plymouth, MN (US)

(73) Assignee: ADEMCO INC., Golden Valley, MN (US)

( * ) Notice: Subject to any disclaimer, the term of this patent is extended or adjusted under 35 U.S.C. 154(b) by 133 days.

(21) Appl. No.: 14/301,863

(22) Filed: Jun. 11, 2014

(65) Prior Publication Data

US 2015/0364135 A1 Dec. 17, 2015

(51) Int. Cl.
*G10L 15/00* (2013.01)
*G10L 15/20* (2006.01)
*H04R 3/00* (2006.01)
*G10L 15/22* (2006.01)
*G10L 21/0208* (2013.01)
*G10L 15/32* (2013.01)
G10L 15/06 (2013.01)
G10L 21/0216 (2013.01)

(52) U.S. Cl.
CPC ............ *G10L 15/20* (2013.01); *G10L 15/22* (2013.01); *G10L 15/32* (2013.01); *G10L 21/0208* (2013.01); *H04R 3/005* (2013.01); G10L 15/063 (2013.01); G10L 2021/02087 (2013.01); G10L 2021/02166 (2013.01)

(58) Field of Classification Search
CPC ....... G10L 15/22; G10L 15/30; G10L 15/265; G10L 17/22; G10L 15/005; G10L 15/20

USPC ................................................. 704/226, 231
See application file for complete search history.

(56) References Cited

U.S. PATENT DOCUMENTS

| | | | | |
|---|---|---|---|---|
| 5,706,399 | A * | 1/1998 | Bareis | B60R 25/04 704/231 |
| 7,228,275 | B1 * | 6/2007 | Endo | G10L 15/32 704/231 |
| 7,529,677 | B1 * | 5/2009 | Wittenberg | G10L 15/30 704/270 |
| 2005/0049864 | A1 | 3/2005 | Kaltenmeier et al. | |

(Continued)

FOREIGN PATENT DOCUMENTS

WO 2015047815 A1 4/2015

OTHER PUBLICATIONS

I. Rodomagoulakis, et al. "Experiments on Far-field Multichannel Speech Processing in Smart Homes." Proceedings 18th International Conference on Digital Signal Processing (DSP 2013), Santorini, Greece, Jul. 2013. 6 pages.

(Continued)

*Primary Examiner* — Vu B Hang
(74) *Attorney, Agent, or Firm* — Husch Blackwell LLP

(57) ABSTRACT

Speech recognition methods, devices, and systems are described herein. One system includes a number of microphones configured to capture sound in an area, a digital signal processor configured to segregate the captured sound into a plurality of signals, wherein each respective signal corresponds to a different portion of the area, and an automatic speech recognition engine configured to separately process each of the plurality of signals to recognize a speech command in the captured sound.

17 Claims, 2 Drawing Sheets

(56) References Cited

U.S. PATENT DOCUMENTS

| | | | |
|---|---|---|---|
| 2006/0233389 A1* | 10/2006 | Mao | H04R 1/406 |
| | | | 381/92 |
| 2011/0125496 A1* | 5/2011 | Asakawa | G10L 15/20 |
| | | | 704/231 |
| 2013/0311175 A1* | 11/2013 | Arakawa | G10L 21/0216 |
| | | | 704/226 |
| 2014/0316778 A1 | 10/2014 | Venkatesha et al. | |
| 2015/0106085 A1* | 4/2015 | Lindahl | G10L 15/32 |
| | | | 704/231 |
| 2015/0194152 A1 | 9/2015 | Katuri | |

OTHER PUBLICATIONS

Shimpei Soda, et al. "Handsfree Voice Interface for Home Network Service Using a Microphone Array Network." 2012 Third International Conference on Networking and Computing. Graduate School of System Informatics, Kobe University. 6 pages.

Amaya Arcelus, et al. "Integration of Smart Home Technologies in a Health Monitoring System for the Elderly." 21st International Conference on Advanced Information Networking and Applications Workshops. IEEE Computer Society. 2007. 6 pages.

Shimpei Soda, et al. "Introducing Multiple Microphone Arrays for Enhancing Smart Home Voice Control." The Institute of Electronics Information and Communication Engineers. Graduate School of System Informatics, Kobe University. 6 pages.

Combined Search and Examination Report from related GB Patent Application No. 1509295.0 dated Jan. 12, 2016, 6 pp.

* cited by examiner

SPEECH RECOGNITION METHODS, DEVICES, AND SYSTEMS

TECHNICAL FIELD

The present disclosure relates to speech recognition methods, devices, and systems.

BACKGROUND

Sound recognition devices can receive and/or record sound in a particular area. For instance, a sound recognition device can recognize and process speech commands received by the device from a speaker. As an example, a speaker can issue a speech command to a voice-responsive thermostat to raise or lower the temperature of a room, and the thermostat can receive and recognize the command, and adjust the room temperature accordingly.

Previous sound recognition devices may work well in ideal conditions, such as when the speaker is close to the device and/or there is no other (e.g., background) noise in the area. However, if the speaker is not close to the device, and/or if there is other background noise (e.g., noise from another speaker, a television, a radio, an appliance, a vacuum cleaner, a barking dog, etc.) present in the area, it may be difficult for previous sound recognition devices to recognize the command issued by the speaker. That is, the performance of previous sound recognition devices may be significantly degraded if the speaker is not close to the device and/or there is other background noise present in the area.

DETAILED DESCRIPTION

Figure 1A:
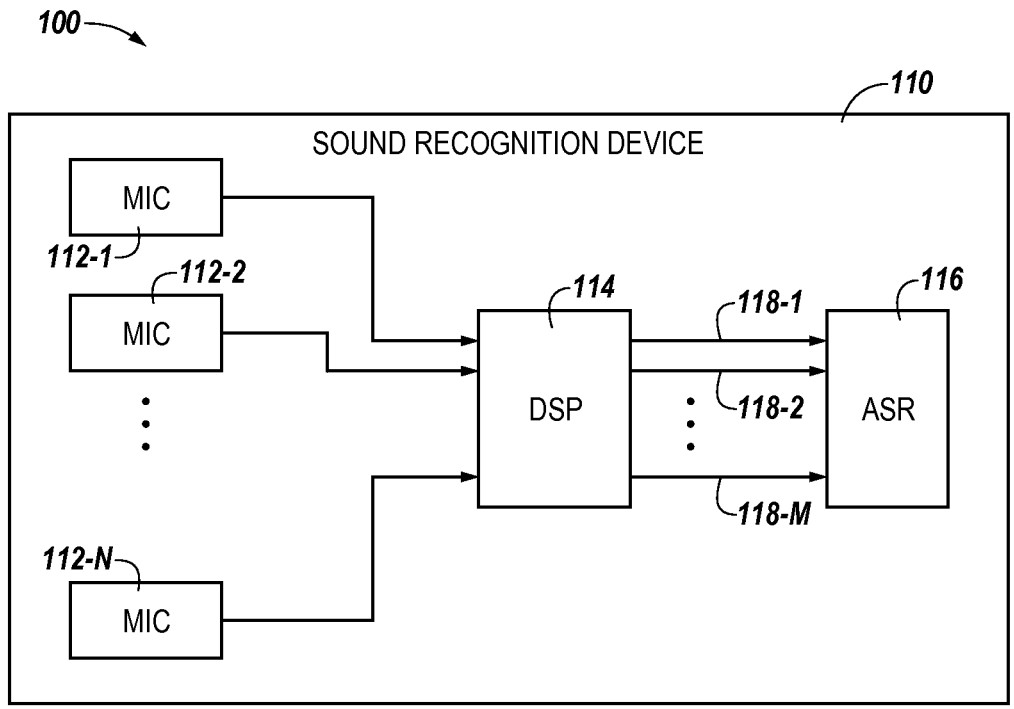
FIG. 1A illustrates a speech recognition system in accordance with one or more embodiments of the present disclosure.

Speech recognition methods, devices, and systems are described herein. For example, one or more embodiments include a number of microphones configured to capture sound in an area, a digital signal processor configured to segregate (e.g., spatially segregate) the captured sound into a plurality of signals, wherein each respective signal corresponds to a different portion of the area, and an automatic speech recognition engine configured to separately process each of the plurality of signals to recognize a speech command in the captured sound.

Speech recognition methods, devices, and systems in accordance with the present disclosure can recognize and process speech commands from a speaker more effectively than previous approaches (e.g., previous sound recognition devices). For example, speech recognition methods, devices, and systems in accordance with the present disclosure can recognize a command issued by a speaker even if the speaker is speaking from a long distance away and/or there is other background noise (e.g., noise from another speaker, a television, a radio, an appliance, a vacuum cleaner, a barking dog, etc.) present in the area.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of microphones" can refer to one or more microphones. Additionally, the designators "N" and "M", as used herein, particularly with respect to the reference numerals in the drawings, indicates that a number of the particular feature so designated can be included with a number of embodiments of the present disclosure.

Figure 1B:
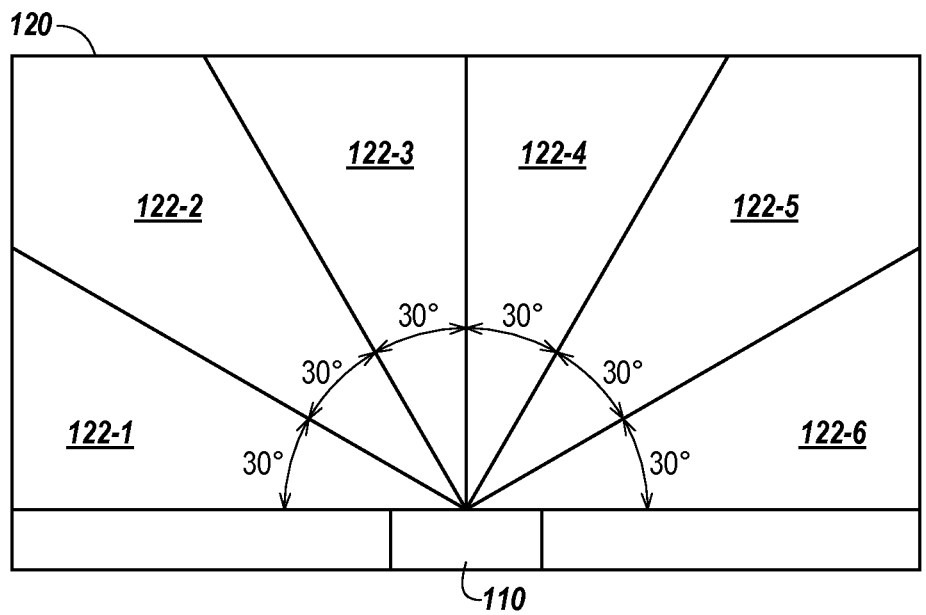
FIG. 1B illustrates an area in which a speech recognition system in accordance with one or more embodiments of the present disclosure may be located and/or operate.

FIG. 1A illustrates a speech recognition system 100 in accordance with one or more embodiments of the present disclosure. As shown in FIG. 1A, speech recognition system 100 can include a sound recognition device 110. FIG. 1B illustrates an area 120 in which speech recognition system 100 (e.g., sound recognition device 110) may be located and/or operate.

Sound recognition device 110 can be, for example, a thermostat (e.g., a voice-responsive thermostat). However, embodiments of the present disclosure are not limited to a particular type of sound recognition device. For example, in some embodiments, sound recognition device 110 can be a television, microwave, refrigerator, security system, fire system, alarm clock, or any other device (e.g., connected home device) that can receive, record, recognize, and/or process sound.

Area 120 can be, for example a room, such as a room of a residential dwelling (e.g., house, apartment, etc.). However, embodiments of the present disclosure are not limited to a particular type of area in which speech recognition system 100 (e.g., sound recognition device 110) may be located or operate.

As shown in FIG. 1A, sound recognition device 110 can include a number of microphones 112-1, 112-2, . . . , 112-N. The number of microphones 112-1, 112-2, . . . , 112-N can be, for example, an array of microphones. For instance, the number of microphones can be a four microelectromechanical system (MEMS) microphones. However, embodiments of the present disclosure are not limited to a particular number or type of microphones.

Although microphones 112-1, 112-2, . . . , 112-N are included in sound recognition device 110 in the embodiment illustrated in FIG. 1A, embodiments of the present disclosure are not so limited. For example, in some embodiments, microphones 112-1, 112-2, . . . , 112-N may be located (e.g., distributed) throughout area 120, instead of in sound recognition device 110.

Microphones 112-1, 112-2, . . . , 112-N can capture sound in area 120. The captured sound can include, for example, a speech (e.g., voice) command issued by a speaker in the area, as well as background noise present in the area, such as other speech noise (e.g., from another speaker) and/or non-speech noise (e.g., noise from a television, a radio, an appliance, a vacuum cleaner, a barking dog, etc.).

As shown in FIG. 1A, sound recognition device 110 can include a digital signal processor (DSP) 114. DSP 114 can receive the sound captured by microphones 112-1, 112-2, . . . , 112-N by, for example, focusing the main lobe of a beam former to a particular direction at a time, and segregate (e.g., spatially segregate) the captured sound into a plurality of signals (e.g., signals 118-1, 118-2, . . . , 118-M), as illustrated in FIG. 1A. DSP 114 can form signals (e.g., beams) 118-1, 118-2, . . . , 118-M using a beam former algorithm, such as, for instance, a delay-sum, multiple signal classification (MUSIC), or estimation of signal parameters via rotational invariant techniques (ESPRIT) beam former algorithm.

Each respective signal 118-1, 118-2, . . . , 118-M can correspond to (e.g., include the sound from) a different portion of area 120. For example, each respective signal 118-1, 118-2, . . . , 118-M can correspond to a different angular portion (e.g., segment) of area 120 with respect to sound recognition device 110 (e.g., microphones 112-1, 112-2, . . . , 112-N). That is, each portion of area 120 can be a different angular segment of area 120.

For instance, in the example illustrated in FIG. 1B, area 120 includes (e.g., is segmented into) angular portions 122-1, 122-2, 122-3, 122-4, 122-5, and 122-6 with respect to sound recognition device 110, and each respective signal 118-1, 118-2, . . . , 118-M can correspond to a different one of these angular portions (e.g., signal 118-1 can correspond to portion 122-1, signal 118-2 can correspond to portion 122-2, etc.). That is, in the example illustrated in FIG. 1B, DSP 114 can segregate the spatial sound captured by microphones 112-1, 112-2, . . . , 112-N into six different signals, with each of the six signals corresponding to a different angular portion 122-1, 122-2, . . . , 122-6 of area 120. Embodiments of the present disclosure, however, are not limited to a particular number of portions of area 120, or to a particular number of signals that can be formed by DSP 114.

In the example illustrated in FIG. 1B, each angular portion 122-1, 122-2, . . . , 122-6 of area 120 has the same angular size (e.g., thirty degrees) with respect to sound recognition device 110. However, embodiments of the present disclosure are not so limited. For example, in some embodiments, area 120 can include angular portions having an angular size of less than thirty degrees (e.g., ten, fifteen, or twenty degrees) with respect to sound recognition device 110. Further, in some embodiments, each angular portion of area 120 may not have the same angular size with respect to sound recognition device 110 (e.g., two or more of the angular portions may have different angular sizes).

As shown in FIG. 1A, sound recognition device 110 can include an automatic speech recognizer (ASR) engine 116. ASR engine 116 can receive signals 118-1, 118-2, . . . , 118-M from DSP 114, and separately (e.g., one at a time) process each of the signals to recognize the speech command issued by the speaker. For instance, ASR engine 116 can, for each signal, separate (e.g., distinguish) the speech command from the background noise. That is, ASR engine 116 can isolate and discard the background noise from each signal to recognize the speech command, as it may be assumed that the speaker and background noise, either intended or unintended, may not originate from the same spatial segment of area 120. Hence, microphones 112-1, 112-2, . . . , 112-N can form the acoustic beam to receive speech commands and/or noise along spatial directions to process and/or segregate the speech commands from the background noise.

Although the embodiment illustrated in FIG. 1A includes a single ASR engine, embodiments of the present disclosure are not so limited. For example, in some embodiments, sound recognition device 110 can include a plurality of ASR engines that can process signals 118-1, 118-2, . . . , 118-N in parallel (e.g., as part of a parallel processing system).

Upon recognition of the speech command, sound recognition device 110 can then take the appropriate action requested by the command. For instance, sound recognition device 110 can adjust its operation (e.g., its operating parameters), and/or the operation of another device, based on (e.g., in response to) the recognized speech command.

As an example in which sound recognition device 110 is a thermostat, the speaker may issue a speech command to adjust (e.g., raise or lower) the temperature of area 120, either generally or to a specific temperature. ASR engine 116 can recognize the command, and adjust the room temperature accordingly. As an additional example, the speaker may issue a speech command to turn on the lights in area 120. ASR engine 116 can recognize the command, and turn on the lights.

Figure 2:
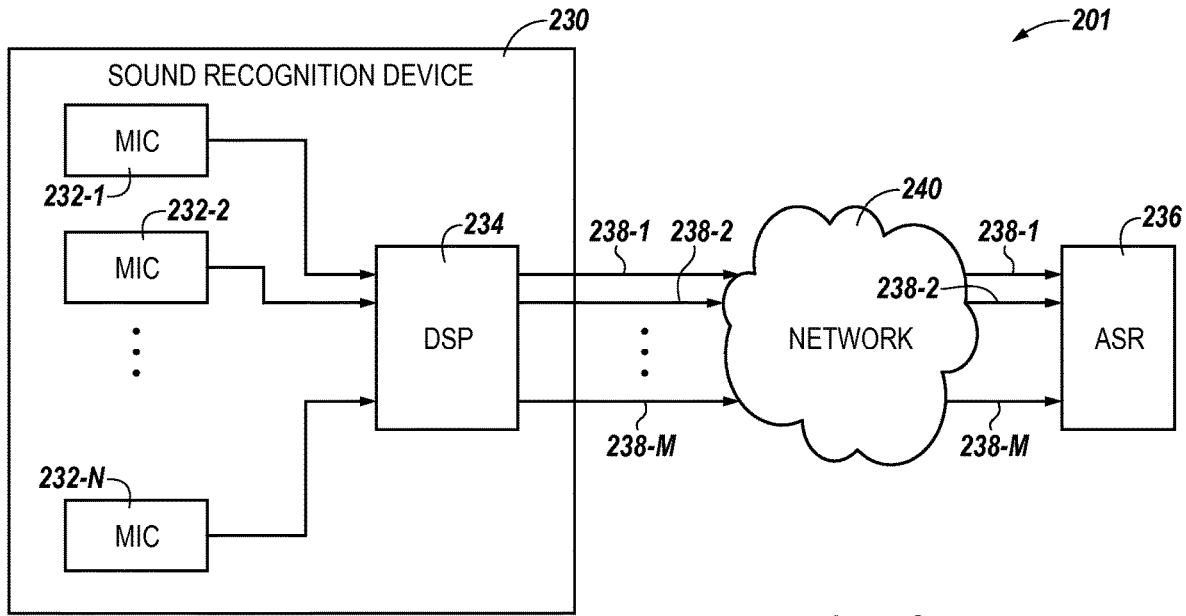
FIG. 2 illustrates a speech recognition system in accordance with one or more embodiments of the present disclosure.

FIG. 2 illustrates a speech recognition system 201 in accordance with one or more embodiments of the present disclosure. As shown in FIG. 2, speech recognition system 201 can include a sound recognition device 230. Sound recognition device 230 can be, for example, a thermostat (e.g., a voice-responsive thermostat). However, embodiments of the present disclosure are not limited to a particular type of sound recognition device, as previously described herein (e.g., in connection with FIGS. 1A and 1B).

As shown in FIG. 2, sound recognition device 230 can include a number (e.g., an array) of microphones 232-1, 232-2, . . . , 232-N. Microphones 232-1, 232-2, . . . , 232-N can capture sound in an area, such as, for instance, area 120 previously described in connection with FIG. 1B. The captured sound can include, for example, a speech (e.g., voice) command issued by a speaker in the area, as well as background noise present in the area, in a manner analogous to that previously described herein (e.g., in connection with FIGS. 1A and 1B).

As shown in FIG. 2, sound recognition device 230 can include a digital signal processor (DSP) 234. DSP 234 can receive the sound captured by microphones 232-1, 232-2, . . . , 232-N and segregate the captured sound into a plurality of signals (e.g., signals 238-1, 238-2, . . . , 238-M), as illustrated in FIG. 2. DSP 234 can form signals (e.g., beams) 238-1, 238-2, . . . , 238-M using a beam former algorithm, in a manner analogous to DSP 114 previously described herein in connection with FIG. 1A.

Each respective signal 238-1, 238-2, . . . , 238-M can correspond to (e.g., include the sound from) a different portion of the area. For example, each respective signal 238-1, 238-2, . . . , 238-M can correspond to a different angular portion (e.g., segment) of the area (e.g., area 120) with respect to sound recognition device 230, in a manner analogous to that previously described herein (e.g., in connection with FIGS. 1A and 1B).

As shown in FIG. 2, speech recognition system 201 can include an automatic speech recognition (ASR) engine 236 that is separate from sound recognition device 230. For example, ASR engine 236 can be communicatively coupled to sound recognition device 230 via a network 240, as illustrated in FIG. 2. For instance, ASR engine 236 can be part of a computing device and/or server that is communicatively coupled to sound recognition device 230 via network 240.

Network 240 can be a wired or wireless network, such as, for instance, a wide area network (WAN) such as the Internet, a local area network (LAN), a personal area network (PAN), a campus area network (CAN), or metropolitan area network (MAN), among other types of networks. As used herein, a "network" (e.g., network 240) can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, network 240 can tie a number of computing devices together to form a distributed control network.

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

As shown in FIG. 2, sound recognition device 230 (e.g., DSP 234) can transmit signals 238-1, 238-2, . . . , 238-M to ASR 236 via network 240. ASR engine 236 can then separately (e.g., one at a time) process each of the signals to recognize the speech command issued by the speaker, in a manner analogous to ASR engine 116 previously described in connection with FIG. 1. Further, although the embodiment illustrated in FIG. 2 includes a single ASR engine, in some embodiments system 201 can include a plurality of ASR engines that can parallelly process the signals, in a manner analogous to that previously described in connection with FIG. 1.

Upon recognition of the speech command, ASR 236 can transmit, via network 240, an instruction to sound recognition device 230 to take the appropriate action requested by the command, and sound recognition device 230 can take the action based on (e.g., in response to) the instruction. For instance, upon recognition of the speech command, ASR 236 can transmit, via network 240, an instruction to sound recognition device 230 to adjust its operation (e.g., its operating parameters), and sound recognition device 230 can adjust its operation based on (e.g., in response to) the instruction.

As an example in which sound recognition device 230 is a thermostat, the speaker may issue a speech command to adjust (e.g., raise or lower) the temperature of the area, either generally or to a specific temperature. ASR engine 236 can recognize the command, and transmit an instruction, via network 240, to sound recognition device 230 to adjust the room temperature accordingly.

Figure 3:
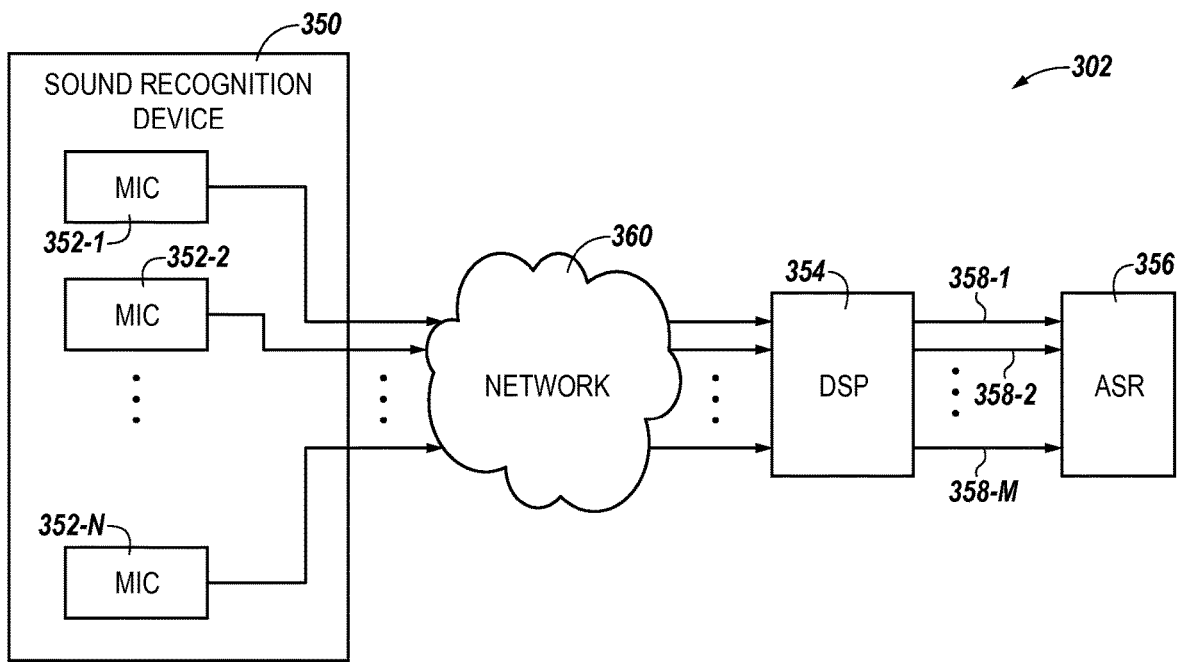
FIG. 3 illustrates a speech recognition system in accordance with one or more embodiments of the present disclosure.

FIG. 3 illustrates a speech recognition system 302 in accordance with one or more embodiments of the present disclosure. As shown in FIG. 3, speech recognition system 302 can include a sound recognition device 350. Sound recognition device 350 can be, for example, a thermostat (e.g., a voice-responsive thermostat). However, embodiments of the present disclosure are not limited to a particular type of sound recognition device, as previously described herein (e.g., in connection with FIGS. 1A and 1B).

As shown in FIG. 3, sound recognition device 350 can include a number (e.g., an array) of microphones 352-1, 352-2, . . . , 352-N. Microphones 352-1, 352-2, . . . , 352-N can capture sound in an area, such as, for instance, area 120 previously described in connection with FIG. 1B. The captured sound can include, for example, a speech (e.g., voice) command issued by a speaker in the area, as well as background noise present in the area, in a manner analogous to that previously described herein (e.g., in connection with FIGS. 1A and 1B).

As shown in FIG. 3, speech recognition system 302 can include a digital signal processor (DSP) 354 an automatic speech recognition (ASR) engine 356 that are separate from sound recognition device 350. For example, DSP 354 and ASR engine 356 can be communicatively coupled to sound recognition device 350 via a network 360, as illustrated in FIG. 3. For instance, DSP 354 and ASR engine 356 can be part of a computing device and/or server that is communicatively coupled to sound recognition device 350 via network 360. Network 360 can be analogous to network 240 previously described herein in connection with FIG. 2.

As shown in FIG. 3, sound recognition device 350 (e.g., microphones 352-1, 352-2, . . . , 352-N) can transmit the captured sound to DSP 354 via network 360. DSP 354 can receive the captured sound, and segregate the captured sound into a plurality of signals (e.g., signals 358-1, 358-2, . . . , 358-M), as illustrated in FIG. 3. DSP 354 can form signals (e.g., beams) 358-1, 358-2, . . . , 358-M using a beam former algorithm, in a manner analogous to DSP 114 previously described herein in connection with FIG. 1A.

Each respective signal 358-1, 358-2, . . . , 358-M can correspond to (e.g., include the sound from) a different portion of the area. For example, each respective signal 358-1, 358-2, . . . , 358-M can correspond to a different angular portion (e.g., segment) of the area (e.g., area 120) with respect to sound recognition device 350, in a manner analogous to that previously described herein (e.g., in connection with FIGS. 1A and 1B).

As shown in FIG. 3, DSP 354 can transmit signals 358-1, 358-2, . . . , 358-M to ASR 356. ASR 356 (or a plurality of ASRs) can then separately (e.g., one at a time) process each of the signals to recognize the speech command issued by the speaker, in a manner analogous to ASR 116 previously described in connection with FIG. 1. Upon recognition of the speech command, ASR 356 can transmit, via network 360, an instruction to sound recognition device 350 to take the appropriate action requested by the command, and sound recognition device 360 can take the action based on (e.g., in response to) the instruction, in a manner analogous to that previously described in connection with FIG. 2.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for speech recognition, the system comprising:
   a number of microphones configured to capture sound in an area;
   a digital signal processor configured to segregate the sound into a first signal and a second signal, wherein the first signal corresponds to a first portion of the area and the second signal corresponds to a second portion of the area; and
   a single automatic speech recognition engine having one or more processing components configured to receive the first signal and the second signal, first process the first signal through all of the one or more processing components and then process the second signal through all of the one or more processing components to recognize a speech command in the sound, and responsive to recognizing the speech command, adjust operation of the single automatic speech recognition engine or another device.

2. The system of claim 1, wherein the number of microphones, the digital signal processor, and the single automatic speech recognition engine are included in a sound recognition device.

3. The system of claim 1, wherein the digital signal processor and the single automatic speech recognition engine are included in a sound recognition device, and wherein the sound recognition device is at least one of a thermostat, a security system, or an alarm clock.

4. The system of claim 1, wherein the number of microphones and the digital signal processor are included in a sound recognition device, and wherein the single automatic speech recognition engine is communicatively coupled to the sound recognition device via a network.

5. The system of claim 1, wherein the number of microphones are included in a sound recognition device, and wherein the digital signal processor and the single automatic speech recognition engine are communicatively coupled to the sound recognition device via a network.

6. The system of claim 1, wherein the area is a room.

7. A method for speech recognition, the method comprising:
   a sound recognition device capturing sound in an area, wherein the sound includes a speech command;
   a digital signal processor of the sound recognition device segregating the sound into a first signal and a second signal, wherein the first signal corresponds to a first portion of the area and the second signal corresponds to a second portion of the area;
   a single automatic speech recognition engine of the sound recognition device that includes one or more signal processing components receiving the first signal and the second signal;
   recognizing the speech command by first processing the first signals through all of the one or more processing components and then processing the second signal through all of the one or more processing components; and
   responsive to recognizing the speech command, the sound recognition device adjusting operation of the sound recognition device or another device.

8. The method of claim 7, wherein the sound includes background noise in the area, and wherein recognizing the speech command includes separating the speech command from the background noise.

9. The method of claim 8, wherein the background noise includes speech noise and non-speech noise.

10. The method of claim 7, wherein each portion of the area includes a different angular segment of the area.

11. The method of claim 7, further comprising:
    the sound recognition device transmitting the first signal and the second signal to the single automatic speech recognition engine.

12. The method of claim 7, further comprising:
    the sound recognition device adjusting the operation of the sound recognition device based on an instruction that is based on the speech command.

13. The method of claim 7, further comprising:
    transmitting the sound from the sound recognition device to the digital signal processor; and
    transmitting the first signal and a second signal from the digital signal processor to the single automatic speech recognition engine.

14. A system for speech recognition, the system comprising:
    a number of microphones configured to capture sound in an area;
    a digital signal processor configured to segregate the sound into a first signal and a second signal, wherein the first signal corresponds to a first angular portion of the area with respect to the number of microphones and the second signal corresponds to a second angular portion of the area with respect to the number of microphones; and
    a single automatic speech recognition engine having one or more processing components configured to receive the first signal and the second signal, first process the first signal through all of the one or more processing components and then process the second signal through all of the one or more processing components to recognize a speech command in the sound, and responsive to recognizing the speech command, adjust operation of the single automatic speech recognition engine or another device.

15. The system of claim 14, wherein the first angular portion and the second angular portion have a same angular size with respect to the number of microphones.

16. The system of claim 14, wherein the first angular portion and the second angular portion have an angular size of thirty degrees with respect to the number of microphones.

17. The system of claim 14, wherein the first angular portion and the second angular portion have an angular size of less than thirty degrees with respect to the number of microphones.

* * * * *